Oct. 30, 1956 R. C. FRANSEEN ET AL 2,768,772
DISPENSER FOR MEASURING GRANULATED MATERIAL
Filed April 29, 1953

Inventors
RICHARD C. FRANSEEN
ELLIOTT W. MICHENER
By
Attorney

United States Patent Office 2,768,772
Patented Oct. 30, 1956

2,768,772
DISPENSER FOR MEASURING GRANULATED MATERIAL

Richard C. Franseen and Elliott W. Michener, St. Paul, Minn.

Application April 29, 1953, Serial No. 351,822

6 Claims. (Cl. 222—455)

This invention relates to a dispenser for measuring granulated detergent materials used for washing dishes, clothes, or other articles. The dispenser is adapted to measure out the granulated soapless material which is sold on the market under different trade names.

We have designed our dispenser for measuring out a predetermined quantity of the granular detergent material which may take the place of ordinary soap, and which usually does not require more than a measured quantity; otherwise, the detergent is wasted and thereby becomes expensive to use.

A feature of our dispenser resides in forming out of plastic a unitary member which can readily be positioned in the corner of a box containing the detergent when a portion of the cover of the box has been removed so as to receive our dispenser device. Once our dispensing device has been placed on the box containing the detergent, it is easy for the user to dispense the desired amount of detergent by merely tipping the container in the proper direction to fill the compartments of the container with the granulated detergent and then moving the container in the desired direction to dispense the amount of detergent desired out of the dispenser.

The dispenser unit may be formed of transparent or translucent plastic so that the user can observe the filling of the compartments of the dispenser with the detergent and tilting the piece containing the detergent in the proper direction.

The dispenser may be molded in a single integral piece by injection molding or otherwise thereby forming the dispenser.

The body of our dispenser is formed with a triangular bottom compartment which is adapted to be filled with the granular detergent through an opening formed in one of the walls of the dispenser. The cover and guard portion extends over and to one side of the opening with an upwardly extending flange at the inner side of the top of the dispenser while a hook-like depending flange is formed on the other side of the dispenser. The front wall of the dispenser adjacent to the depending hook-like flange is solid and the rear wall extends from the bottom of the front wall at an upwardly inclined angle terminating in the top flange which projects above the top of the dispenser. Thus, we provide a dispenser having a triangular pocket formed therein with an opening formed in the inclined wall thereof directly under the hood portion. The hood portion is formed integrally with the front perpendicular wall of the dispenser and the rear angularly disposed wall thereof. This forms a brace-like portion between the front perpendicular wall and the back inclined wall of the dispenser.

The simplicity of our dispenser provides a means of attaching the unit dispenser to a cardboard box which contains a detergent where the same remains until all of the detergent has been used up out of the box. Further, the simple form of our dispenser provides an economical attachment for a detergent box and permits the user of the detergent to virtually dispense out of the box just the desired amount thereof without wasting it, thereby making the use of our dispenser valuable to the user because it actually saves material and is so easily operated, simply by tilting the box on which the unit dispenser is attached.

In the drawings forming a part of this specification:

Figure 1:
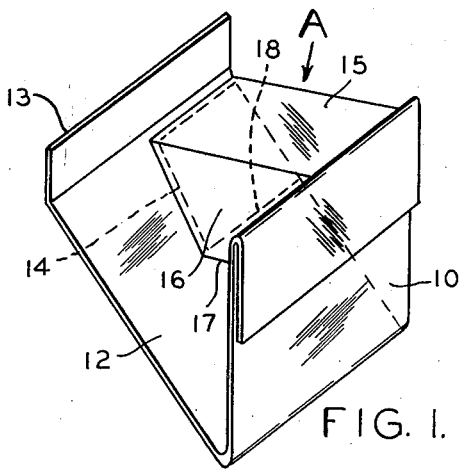
Figure 1 is a perspective view of our dispenser and measuring unit for granulated material.
Figure 2:
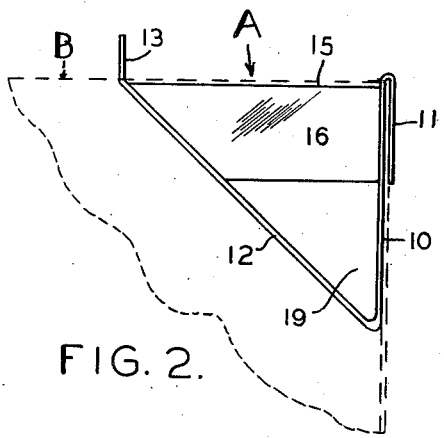
Figure 2 illustrates a side view of our dispenser showing the position that it would occupy in the corner of a box containing a detergent, the portion of the box being broken away and the outline thereof being illustrated in dotted outline.
Figure 3:
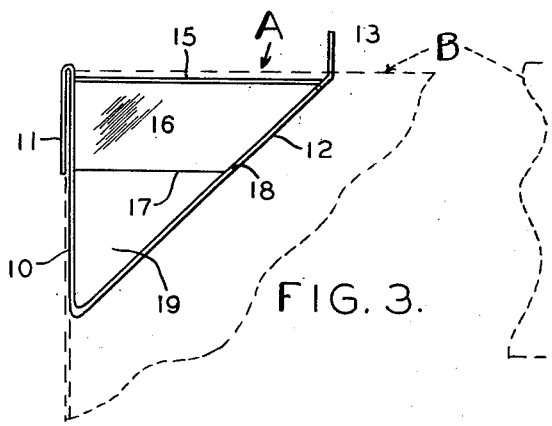
Figure 3 is a side view taken in the opposite direction to that illustrated in Figure 2.

The drawings illustrate our dispenser A formed in a single piece of plastic material, preferably transparent and adapted to be slipped into a corner of the box B when a portion of the top of the box has been removed so as to admit the dispenser therein.

The dispenser A may be formed by injection molding to provide a front vertical wall 10 which is formed with a hook-like portion 11 at the top thereof. Integrally extending from the bottom of the front wall 10, we provide a back inclined wall 12 which inclines away from the front wall 10 and is formed with a top flange 13 projecting above the top of the dispenser A. The flange 13 permits the user of our dispensing unit to engage the same in inserting the unit on the box B or in removing it therefrom.

An opening 14 is formed in the inclined wall 12 and is adapted to be covered by the hood portion 15 which extends from the front wall 10 to the rear wall 12 and is formed with a depending flange 16, the lower edge 17 of which extends just below the lower edge 18 of the opening 14.

The dispenser unit A is adapted to be readily placed upon the box B as illustrated in the drawings in Figures 2, 3, 4, 5, and 6, Figures 2, 3, and 4 indicating the outline of the box in dotted lines.

Figure 5:
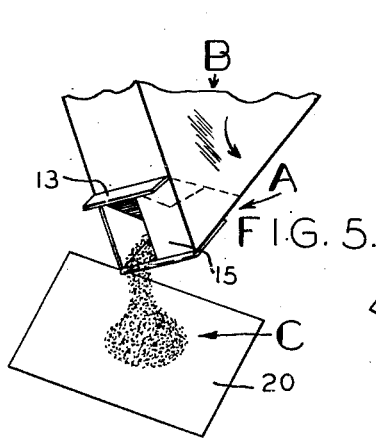
Figure 5 illustrates the corner of a box containing the detergent and on which our dispensing and measuring unit is attached showing the manner in which the box is tilted directly forward to the corner of the box in which our dispenser is positioned.

When my dispenser A is attached to the corner of the box B, the box may be tilted forwardly in the direction of the arrow as illustrated in Figure 5 which will cause the granular detergent particles to fill the compartment 19 which compartment is of a triangular-like shape bounded by the front wall 10 and the rear inclined wall 12 and the side walls of the box containing the detergent. The walls 10 and 12 of the unitary dispenser A are wide enough to contact the sides of the box B. Thus, the pocket 19 provides the recess into which the granular detergent can come when the box is tilted forwardly as illustrated in Figure 5. The detergent comes from the supply in the box B through the opening 14 formed in the dispenser A.

It will also be apparent that if the box B is tilted far enough forwardly in the direction of the arrow indicated in Figure 5, a small amount of detergent C which is substantially not under the hood 15 will be discharged out onto the surface 20.

In dispensing detergent from the box B as just described, moving the box in the direction of the arrow as shown in Figure 5, the amount of detergent that will be dispensed out of the pocket 19 will be that portion which is outside of the hood 15 and below the edge 17 of the flange 16 of the hood. The hood 15 will prevent more detergent from being dumped out of the dispenser A.

Figure 6:
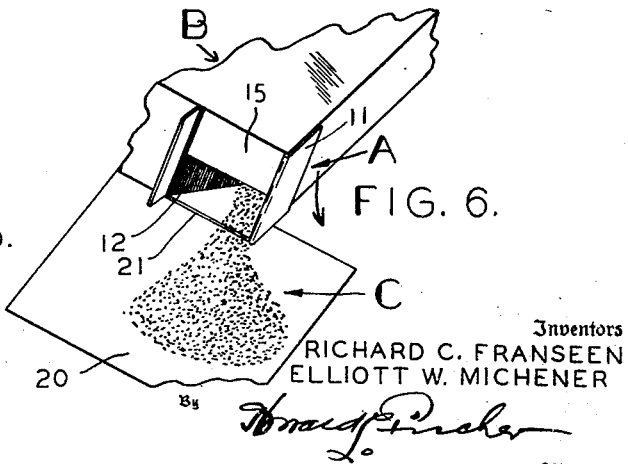
Figure 6 illustrates a portion of a corner of the box containing the detergent showing the manner in which the box is tilted to one side, or in a position at right angles to the position shown in Figure 5. The tilting of the container in this direction will dispense a larger amount of granular detergent than the tilting of the box in the direction illustrated in Figure 5.

When a larger amount of detergent is desired to be dispensed from the box B by the dispenser A, the operator holds the box so that it can be tilted to one side or toward the side away from the hood 15, and as illustrated by the rotation of the box to one side by the arrow shown in Figure 6. When the box B is rotated in this manner, a larger amount of detergent C will be dispensed onto the surface 20 than was dispensed by the operation shown in Figure 5.

If more detergent is desired to be dispensed than is provided for by the pocket 19 and the operations shown in Figures 5 and 6, these operations can be repeated to dispense the desired amount of detergent.

Figure 4:
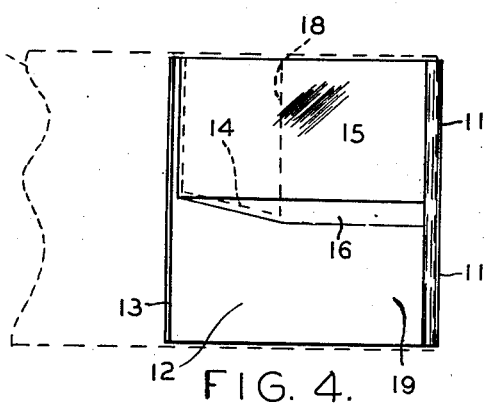
Figure 4 is a planned view looking down on top of the dispenser.

In observing Figure 4, it will be apparent that the hood portion 15 extends over substantially half of the compartment portion 19 and when the box B is rotated as heretofore described and illustrated in Figure 5, practically half of the detergent in the compartment 19 will be dispensed over the top of the hook portion 11. When the container B is moved and rotated as described in Figure 6 and as heretofore set forth virtually all of the detergent C which was measured out into the pocket 19 is dispensed out of the same. In operating the box B in this manner the detergent C is poured over the top edge 21 of the side wall of the container B.

The hood portion 15 is adapted to virtually divide the dispensing pocket 19 so that a lesser amount of detergent is poured out in moving the box B as illustrated in Figure 5 and a greater amount of detergent is poured out in moving the box into the position as illustrated in Figure 6.

The dispenser A is simple in construction, may be easily formed by injection molding in a plastic molding machine and the dispenser is formed integrally thus forming a dispensing device of economical construction and a desirable nature. The dispenser A may be easily attached to the box by anyone and can carry advertising material on the face thereof, if it is desired, or any other indicia such as instructions for attaching and using the dispenser A.

The dispenser A is designed primarily to dispense granulated material which is sold on the market under different trade names and which products are used for cleaning purposes such as dishes, clothes, and other articles including automobiles, bathrooms and fixtures etc. Virtually all of these cleaning products are of a granular powder-like nature and some soaps are also sold in this form. It will be apparent that our dispenser A is designed to be used with any or all of these cleaning products and that the dispenser provides a measuring means for dispensing out a predetermined amount of the cleansing product or detergent. In using these cleaning products heretofore, the housewife or user would open the package and have to guess how much product to use.

We claim:

1. A dispenser adapted to be used in a box containing a detergent including a plastic transparent body having a measuring compartment formed with a front wall and an inclined rear wall into which the detergent is adapted to be filled from the container, said rear wall having an offset opening leading to said compartment, a hood extending over said opening and formed with a depending brace connecting said front and rear walls of the dispenser to partially divide the compartment in two parts, said dispenser acting to dispense a predetermined amount of detergent from one of the parts of the measuring compartment when the dispenser is moved in one direction and to dispense a larger amount of detergent from the other of the two parts when said dispenser is moved in another direction.

2. A reuseable plastic dispenser for a box of granulated detergent material adapted to be removably inserted into a box having a vertical wall, an inclined backwardly extending wall projecting from the bottom of said vertical wall, a hook-like end formed on top of said vertical wall, said inclined wall having an opening formed therein near the top thereof, a hood extending over said opening and formed with a depending flange, and an upwardly extending flange at the top of said inclined wall of said dispenser, said dispenser being adapted to fit between the walls of and positioned at the corner of a box containing a granular detergent.

3. A reuseable plastic transparent integrally formed dispenser for dispensing predetermined amounts of a granular detergent comprising a body formed of transparent plastic material having an upwardly extending vertical wall, a hook-like portion formed at the top of said wall, a backwardly inclined wall extending from the bottom of said vertical wall, an offset two sided hood portion extending between said vertical wall and said inclined wall, said inclined wall having a detergent dispensing opening formed therein under said hood.

4. An integrally formed plastic transparent dispenser for detergent and like materials including an inclined bottom wall, said inclined wall having a dispensing opening formed therein near the top thereof, a flange projecting upwardly from the top of said inclined wall, a vertical wall extending from the bottom of said inclined wall and formed in a hook-like end at the top thereof adapted to removably engage the side wall of the box and a hood portion extending from said inclined wall to said vertical wall and positioned above said dispensing opening and having a depending flange on one side thereof extending along the side of said dispensing opening.

5. A transparent integral plastic dispenser for detergents having a granular nature adapted to be removably inserted into the box, a measuring pocket having front and rear walls formed in the bottom of said dispenser, an opening in one wall of said pocket to permit the filling of said measuring pocket with the granular detergent, a hood member extending between the walls of said pocket and acting as a brace therebetween, said hood extending over said opening and having a depending flange on one side of said hood and extending along one side of said dispensing opening, said hood and depending flange acting to divide the material dispensed from said pocket so as to dispense virtually one-half of the detergent in said pocket when said dispenser is rotated in a forward direction and to dispense double the amount of detergent when rotated in a sidewise direction.

6. A detergent dispenser adapted to be positioned within the corner of a cardboard box containing the detergent having an integrally formed body of transparent plastic, said dispenser including two main walls which extend between the side walls of the box in which the supply of detergent is contained, means for holding said dispenser at the top corner of the cardboard box containing the detergent, one of the walls of said dispenser having a detergent dispensing opening formed therein adjacent the top thereof, a hood extending over said dispensing opening in said wall, a depending dividing wall formed on said hood and extending along one side of said detergent dispensing opening and a measuring pocket formed by the walls of said dispenser positioned below said detergent dispensing opening, the depending wall of said hood acting to divide the detergent material in said pocket so that by tilting the dispenser in one direction virtually half of the detergent in said pocket will be dispensed out of the same and by tilting the dispenser in another direction virtually all of the detergent is dispensed out of said pocket.

References Cited in the file of this patent

UNITED STATES PATENTS

| Number | Name | Date |
|---|---|---|
| 1,931,270 | Rice | Oct. 17, 1933 |
| 1,983,707 | Rice | Dec. 11, 1934 |
| 2,023,537 | Myers | Dec. 10, 1935 |
| 2,243,452 | Bickel et al. | May 27, 1941 |
| 2,318,812 | Spilo | May 11, 1943 |
| 2,523,426 | Gray | Sept. 26, 1950 |